United States Patent [19]
Daugherty

[11] Patent Number: 5,316,393
[45] Date of Patent: May 31, 1994

[54] DUPLEX ROLLING ELEMENT BEARING MOUNTING FOR ENSURING PRELOAD CONTROL

[75] Inventor: Thomas L. Daugherty, Arnold, Md.

[73] Assignee: The United States of America as represented by the Secretary of the Navy, Washington, D.C.

[21] Appl. No.: 953,339

[22] Filed: Sep. 30, 1992

[51] Int. Cl.⁵ .................................. F16C 33/58
[52] U.S. Cl. ................................ 384/517; 384/518
[58] Field of Search ............... 384/517, 518, 504, 493, 384/613, 611, 563

[56] References Cited

U.S. PATENT DOCUMENTS

| | | | |
|---|---|---|---|
| 1,448,189 | 3/1923 | Brunner | 384/611 |
| 1,923,399 | 8/1933 | Sharp | 384/517 |
| 2,433,518 | 12/1947 | Ljunggren | 384/517 |
| 2,711,356 | 6/1955 | Ensinger | 384/517 |
| 3,934,957 | 1/1976 | Derner | 384/563 |
| 4,116,506 | 9/1978 | Moritomo et al. | |
| 4,227,755 | 10/1980 | Lundberg | 384/518 |
| 4,325,590 | 4/1982 | Pethis | 384/518 |
| 4,523,864 | 6/1985 | Walter et al. | 384/517 X |
| 4,699,528 | 10/1987 | Gotman | 384/518 X |
| 4,732,495 | 3/1988 | Brandenstein et al. | 384/518 |
| 4,913,564 | 4/1990 | Stephan et al. | 384/518 |
| 4,961,654 | 10/1990 | Pangburn et al. | 384/517 |
| 5,000,589 | 3/1991 | Ogata et al. | 384/517 X |

FOREIGN PATENT DOCUMENTS

| | | | |
|---|---|---|---|
| 67256 | 4/1940 | Czechoslovakia | 384/563 |
| 582962 | 9/1933 | Fed. Rep. of Germany | 384/563 |
| 207523 | 12/1983 | Japan | 384/517 |

Primary Examiner—Thomas R. Hannon
Attorney, Agent, or Firm—Charles D. Miller

[57] ABSTRACT

An apparatus for mounting face-to-face angular contact bearings to ensure preload control. Face-to-face angular contact paired bearings have inner races and outer races. The inner races of the bearings are fitted on an element to be supported such as a shaft. The outer races of the bearings are fitted in a bearing housing with a first gap Δ1 therebetween. Preloading of the bearings is achieved by inserting preload springs between external surfaces of the outer races and respective bearing housing surfaces. A second gap Δ2 may also be provided between the bearing housing and the external surface of one of the outer races to prevent a change in preload due to thermal gradients.

4 Claims, 1 Drawing Sheet

DUPLEX ROLLING ELEMENT BEARING MOUNTING FOR ENSURING PRELOAD CONTROL

BACKGROUND OF THE INVENTION

The present invention relates in general to a bearing mounting method and apparatus to ensure preload control and in particular to a bearing mounting method and apparatus to ensure preload control in face-to-face angular contact paired bearings.

Many naval and marine applications such as pumps require axial stiffness (thrust) control under a variety of operating conditions where the bearing loads are primarily axial loads and often alternate in direction. Duplex ball bearings are usually the designer's choice. Either face-to-face (DF) or back-to-back (DB) mounting arrangements are used with preload built into the bearings by machining surfaces of the bearings and clamping the bearings together in a housing, in the case of DF, or clamping the bearings on the shaft with a lock nut in the case of DB.

There are two major problems with such designs. First, the built-in preload may be significantly increased or decreased due to thermal gradients developed during operation which can overload the bearing or eliminate the original preload. Additionally, because the preload is established by loading one bearing against the other, applied external loads can reduce the load on one of the bearing pair. If a certain thrust load is not maintained on the bearings, ball skidding may result. Ball skidding produces increased noise, surface damage, and higher bearing temperatures. Ultimately, premature failure of the bearing may result.

SUMMARY OF THE INVENTION

It is an object of the present invention to provide a method and apparatus for mounting face-to-face angular contact paired bearings with a predetermined amount of preload.

It is another object of the present invention to provide a method and apparatus for mounting face-to-face angular contact paired bearings to ensure preload control during thrust reversals.

It is a further object of the present invention to provide a method and apparatus for mounting face-to-face angular contact paired bearings to allow for thermal growth within the bearing pair.

It is a still further object of the present invention to provide a method and apparatus for mounting face-to-face angular contact paired bearings to allow for thermal growth of the bearing pair relative to the housing.

These and other objects of the present invention are accomplished by a method for mounting face-to-face angular contact paired bearings comprising the steps of providing face-to-face angular contact paired bearings having inner races and outer races and rolling elements therebetween; fitting the inner races of the bearings on an element to be supported; mounting the outer races of the bearings in a bearing housing with a first gap between the outer races; and preloading the bearings by inserting preload springs between external surfaces of the outer races and respective bearing housing surfaces.

The method of the invention further includes the step of mounting the outer races in the bearing housing with a second gap between the bearing housing and the external surface of one of the outer races.

The invention may also be characterized as face-to-face angular contact paired bearings having inner races, outer races and rolling elements therebetween. The inner races of the bearings are mounted on an element to be supported (usually a rotating shaft). The outer races of the bearings are mounted in a bearing housing with a first gap $\Delta 1$ between the outer races. The bearings further contain a device for preloading the bearings using two preload springs positioned between external surfaces of the outer races and respective bearing housing surfaces.

BRIEF DESCRIPTION OF THE DRAWINGS

The invention is described in reference to the sole FIG. 1 which illustrates a fragmentary view of a partial cross section of face-to-face angular contact paired bearings mounted in accordance with the present invention.

DETAILED DESCRIPTION OF THE PREFERRED EMBODIMENTS

Figure 1:
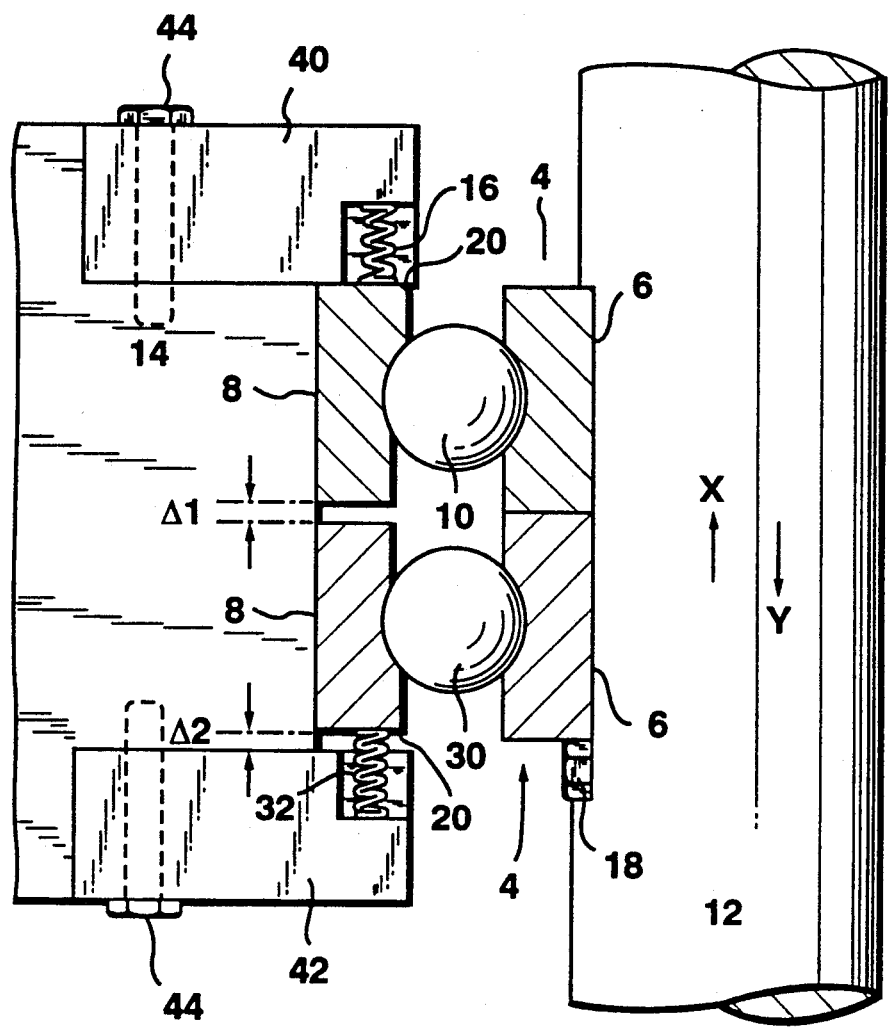

Referring to the FIGURE, an element to be supported by a bearing is commonly a shaft 12. Face-to-face angular contact paired bearings 4 are used to support the shaft 12 and can absorb both radial and axial (thrust) loads. The face-to-face angular contact paired bearings 4 include inner races 6, balls 10, 30 and outer races 8. The inner races 6 are fitted onto the shaft 12. Although only two balls 10, 30 are illustrated, it is to be understood that generally a plurality of balls are utilized in each bearing.

It is common that the bearing inner races 6 have interference fits with the shaft 12. A common procedure for fitting the inner races 6 onto the shaft 12 is to expand the bearings 4 by heating them, placing the inner races 6 on the shaft 12, and then allowing the bearings to cool. The inner races 6 thus obtain a shrink fit on the shaft 12. A lock nut 18 threaded on the shaft 12 can be used to tighten the inner races 6 in place.

In the prior art, face-to-face angular contact paired bearings are preloaded by forcing the outer races 8 together so that the gap $\Delta 1$ is eliminated. Initial preload is controlled by the amount of material removed, at the time of manufacture, from the internal faces of the outer races 8. The bearing is then clamped in a housing to maintain the outer races 8 in their preloaded condition. Preloading prevents the balls in the bearing from skidding which results in noise, surface damage, higher temperature operation, and ultimately, premature failure. As discussed earlier, in the prior art, the preload is established by loading one bearing against the other. Therefore, an applied external thrust or axial load results in an increase in load on one bearing and a reduction in load on the other bearing. If a certain thrust load is not maintained on each bearing, ball skidding may occur.

In the present invention, face-to-face angular contact paired bearings 4 are provided. The outer races 8 of the bearings 4 have a gap $\Delta 1$ between them to allow preload of the bearings by springs. The width of $\Delta 1$ depends on the deflections under preloading. The size of the bearing and the particular application of the bearing determines the preload. Generally, the manufacturer of the equipment being used will specify a desired preload. Different sizes for the gap $\Delta 1$ can be obtained by specifying bearings having different amounts of "stick-out".

After the inner races 6 of the bearings 4 are fitted to the shaft 12, the outer races 8 having a gap $\Delta 1$ between them are mounted in a housing 14. The housing 14 includes removable endcaps 40,42 for inserting and removing the bearings. The endcaps 40,42 are held in place by bolts 44. In contrast to the prior art, preload is accomplished by inserting preload springs 16, 32 between external surfaces 20 of the outer races 8 and the respective bearing housing surfaces.

As shown in the FIGURE, preload springs 16, 32 are inserted on outer ends of the bearings 4. The preload springs 16, 32 are commercially available and may be of the belleville washer type, wavy washer type, or a series of coil springs. The stiffness of the spring depends on the preload recommended by the manufacturer.

A particular advantage of the present method is that when the bearings 4 are subjected to thrust loads in either directions x or y, the balls in the bearings represented herein by balls 10,30 remain preloaded by the preload springs 16, 32. For example, if a thrust load is imposed in the x direction, the upper preload spring 16 will compress and the lower preload spring 32 will expand. However, the lower set of balls represented by ball 30 will remain preloaded by the compressive force of the lower preload spring 32. In a conventionally preloaded bearing, when a force in the x direction is applied to the bearing, the lower set of balls represented by ball 30 could lose its preload (if the thrust load is large enough) and become susceptible to skidding.

If the bearings 4 are subjected to a force applied in the y direction, the lower preload spring 32 will compress and the upper preload spring 16 will expand. The upper preload spring 16 will maintain the preload force on the upper set of balls represented by ball 10, thereby preventing skidding of the upper set of balls. Therefore, both the upper set of balls and lower set of balls will remain preloaded when the bearings are subjected to thrust loads in either directions x or y.

A further advantage of the gap $\Delta 1$ is to allow for thermal expansion within the bearing pair. This prevents the preload from being increased or decreased due to thermal expansion during operation, which could overload the bearing or eliminate the original preload.

Although not critical to the present invention, the outer races 8 may be mounted in the bearing housing 14 so that a second gap $\Delta 2$ is formed between the bearing housing 14 and an external surface 20 of one of the outer races 8. The gap $\Delta 2$ allows for thermal expansion of the bearings relative to the housing. The gap $\Delta 2$ prevents the preload from being increased or decreased due to thermal gradients during operation.

When the bearings 4 are mounted with a gap $\Delta 2$, the location of the gap $\Delta 2$ will change depending on the direction of the applied force. If the force is applied in the x direction, the gap $\Delta 2$ will appear adjacent to the lower preload spring 32 as shown in the FIGURE. If the load is applied in the y direction, the lower preload spring 32 will compress and the gap $\Delta 2$ will appear at a corresponding location adjacent the upper preload spring 16.

Although the invention has been described in reference to preferred embodiments, various modifications and further embodiments may be made without departing from the spirit and scope of the invention. For example, the same concept may be applied to other than ball bearings, such as tapered roller bearings.

What is claimed is:

1. A bearing assembly comprising:
   face to face angular contact paired bearings having two inner races, a first outer race, a second outer race and rolling elements between the inner races an the outer races;
   said inner races of said bearings being mounted on a shaft to be supported;
   a housing for providing support for the outer races, said housing having a first inner surface, a second inner surface, a third inner surface and a fourth inner surface;
   said first inner surface and said second inner surface are spaced apart and face each other;
   said third inner surface and said fourth inner surface are spaced apart and face each other,
   said first outer race having a first external surface and a second external surface;
   said second outer race having a first external surface and a second external surface;
   a first spring;
   a second spring;
   said outer races and said springs being mounted within the said housing so that the recited elements are positioned in the following sequence:
   a. the said first inner surface of the housing,
   b. the said first spring,
   c. the said first external surface of said first outer race,
   d. the said second external surface of said first outer race,
   e. an air gap $\Delta a$,
   f. the said second external surface of sad second outer race,
   g. the said first external surface of said second outer race
   h. the said second spring, and
   i. the said second inner surface; and
   said springs preload the said outer races such that a gap $\Delta 2$ exists between the said first external surface of said second outer race and the said fourth inner surface of the housing and the said first external surface of said first outer race is substantially in contact with the sad third inner surface of the housing.

2. A bearing assembly as in claim 1 wherein the springs are belleville washer springs.

3. A bearing assembly as in claim 1 wherein the first spring si comprised of a series of coil springs.

4. A bearing assembly as in claim 1 wherein said inner races are mounted on said shaft by a shrink fit.

* * * * *